UNITED STATES PATENT OFFICE.

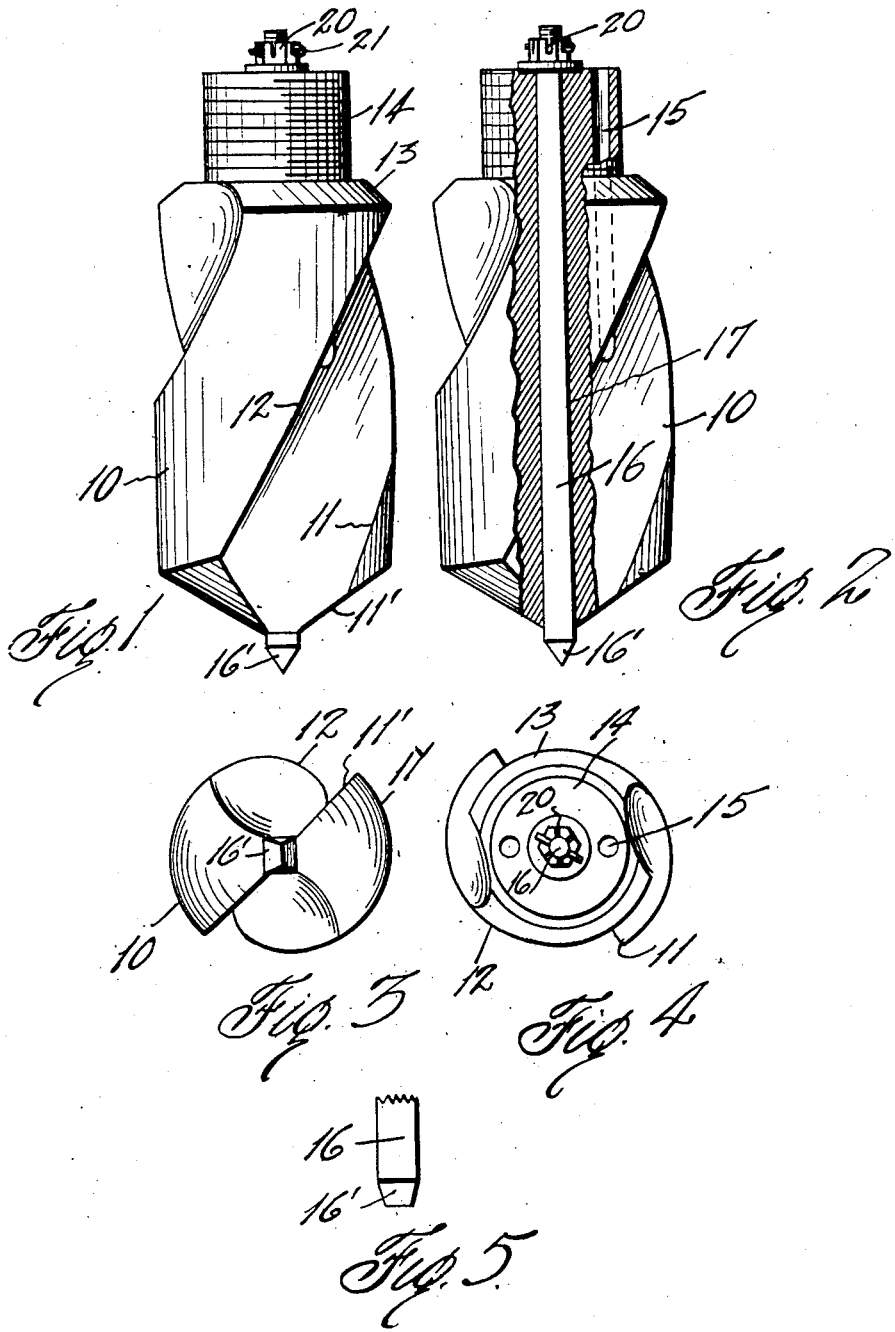

PENELTON G. MIDGETT, OF DALLAS, TEXAS.

WELL-DRILLING BIT.

1,387,733.  Specification of Letters Patent.  Patented Aug. 16, 1921.

Application filed February 15, 1921. Serial No. 445,089.

*To all whom it may concern:*

Be it known that I, PENELTON G. MIDGETT, a citizen of the United States, residing at Dallas, in the county of Dallas and State of Texas, have invented certain new and useful Improvements in Well-Drilling Bits, of which the following is a specification.

This invention relates to new and useful improvements in well drilling bits.

The invention contemplates the provision of a drilling point arranged to operate in advance of the cutting edges of the bit so as to center the bit and cause it to bore true. One of the features is to make the point removable so that it may be readily sharpened or replaced if necessary. Another feature resides in the provision of a twist drill head having cutting edges disposed at a greater radial distance from the center of the bit than the remainder of the structure whereby ample clearance is given the bit.

A structure designed to carry out the invention will be hereinafter described together with other features of the invention.

The invention will be more readily understood from a reading of the following specification and by reference to the accompanying drawings, in which an example of the invention is shown and wherein:

Figure 1 is an elevation of a drill bit embodying the invention,

Fig. 2 is a similar view, partially in section and showing the removable point,

Fig. 3 is an underside view of the bit.

Fig. 4 is a plan view of the same, and

Fig. 5 is a detail of the point.

In the drawings the numeral 10 designates a head or body of the usual twist drill formation, with the exception that the cutting edges 11 have the greatest radial projection as will be apparent from an observation of Figs. 3 and 4. The surface of each face is gradually cut back from the cutting edge 11 thereof, toward the trailing edge 12. This construction gives the head liberal clearance and a free cutting edge which will operate at its highest efficiency at all times.

The head is shouldered at 13 and is provided with a screw threaded shank 14 adapted to be connected with a line of pipe by means of a tool joint or the like. This head may be made of any hard durable steel and may be sharpened. The underside of the head is tapered in the usual manner and has cutting edges 11' contiguous to the edges 11. The usual water courses 15 extend down through the shank and the head for supplying water to the cutting edges.

One of the essential features of the invention resides in a point member 16 which extends axially of the head through a tapering socket 17 in which it fits snugly. The member has a gradually tapering shape so as to snugly fit in the socket 17 of the head and the shank. The upper end of the member is screw threaded and receives a nut 20 bearing on the top of the shank. The nut is notched to receive a cotter pin 21 passing through the tenon and locking the parts in position as is obvious.

The point member 16 preferably has a chisel point 16' which projects well below the cutting edges 11'. This gives the point an ample opportunity to drill into rock and other hard substances before the cutting edges 11' are brought into operation; whereby spinning of the drill head is obviated and a lead hole is constantly drilled. Such a structure will preserve the cutting edges of the head so they will not dull as quickly. The point member may be made of a special metal to stand the constant cutting and centering action.

The point member may be removed when desired. This bit will operate evenly and will cut very fast.

Various changes in the size and shape and modifications may be made without departing from the spirit of the invention.

What I claim, is:

1. In a well drilling bit, a head having spiral cutting edges and receding faces, and a point member removably inserted axially of the head and having a drilling point projecting from the head.

2. In a well drilling bit, a head having spiral cutting edges and receding faces, a point member removably inserted axially of the head and having a drilling point projecting from the head, and means for fastening the point in the head.

3. In a well drilling bit, a head having spiral cutting edges and a tapered underside with cutting edges contiguous to the spiral cutting edges, a shank on the upper end of the head, the head and shank having an angular opening extending axially therethrough, and a point member fitting snugly in said opening and having a cutting point extending well below the underside of the head.

In testimony whereof I affix my signature.

PENELTON G. MIDGETT.